United States Patent [19]

Brandon

[11] Patent Number: 4,967,607
[45] Date of Patent: Nov. 6, 1990

[54] INSPECTION PORTS FOR FLUID FLOW MEASURING SECTIONS

[75] Inventor: Ronald E. Brandon, Schenectady, N.Y.

[73] Assignee: The Mustan Corporation, Rexford, N.Y.

[21] Appl. No.: 421,812

[22] Filed: Oct. 16, 1989

[51] Int. Cl.$^5$ .............................................. F16L 55/10
[52] U.S. Cl. ................................................... 73/865.8
[58] Field of Search ............. 73/86, 104, 865.8, 865.9, 73/866.5, 861.61, 861.62; 138/90; 137/559; 356/241

[56] References Cited

U.S. PATENT DOCUMENTS

| | | | |
|---|---|---|---|
| 1,690,183 | 11/1928 | Stoughton | 138/90 |
| 2,581,536 | 1/1952 | Johns | 138/90 |
| 3,451,432 | 6/1969 | Miller | 138/90 |
| 3,996,124 | 12/1976 | Eaton et al. | 73/86 |
| 4,703,664 | 11/1987 | Kirkpatrick et al. | 73/866.5 |

Primary Examiner—Robert Raevis

[57] ABSTRACT

Inspection port plugs for fluid flow measuring sections are separated from the access and sealing flanges that have been employed in the past. This permits more accurate and faster positioning of the plug that is no longer vulnerable to faulty flange positions caused by flange gasket stiffness or bolt tightness.

1 Claim, 3 Drawing Sheets

INSPECTION PORTS FOR FLUID FLOW MEASURING SECTIONS

In modern flow measuring systems it is normal to employ very carefully machined and polished flow nozzles with elliptical inlet surfaces and cylindrical throats. The (ASME) has written standards for flow measurement (Fluid Meters, Performance Test Code PTC 19.5, and MFC-3M-1985). In addition there is an International Standard ISO 5167.

During long term operation it is possible that flow deposits or surface damage may occur that would result in changed characteristics of an installed nozzle, leading to errors in the deduced flow rate.

As a result of this possibility the ASME has also suggested an inspection port which can be used during shut down periods to examine the nozzle to determine whether any flow side surface changes have occurred. This is included in ANSI/ASME PTC6.1-1984.

The inspection port, to be effective, must be located close to the inlet of the nozzle. At such locations, any pipe-wall discontinuities may cause harmful inaccuracies in the flow measurement. As a result the ASME recommendations for such ports include a plug that is an integral part of the bolted blind flange that prevents leakage during operation. In the ASME document, the plug is allowed to recess into the pipe a small amount. This is an attempt to assure that the plug does not intrude into the flow. This makes it difficult to make the required pipe bore with the plug assembled. In addition, the gasket gap between the blind flange and the pipe flange is to be measured and recorded so that subsequent disassembly and reassembly can result in approximately the same physical condition as that originally existing when the pipe and plug were originally bored.

This system has significant disadvantages. The gap between the flanges is determined by the compression of the gasket. The machining process itself may effect the gasket compression, resulting in an imperfect surface of the plug and a poor match with the pipe surface. It is also difficult and time consuming to exactly re-establish the same flange gap by tightening and loosening the inspection port flange bolts. Any variation could result in an indeterminable flow measurement error. These disadvantages and others are overcome by the following invention which eliminates the gasket from being the positioning means of the inspection port plug. The plug is held firmly during machining. Its original position is accurately re-establishable after inspection.

These and other advantages will become apparent from the following description.

Figure 1:
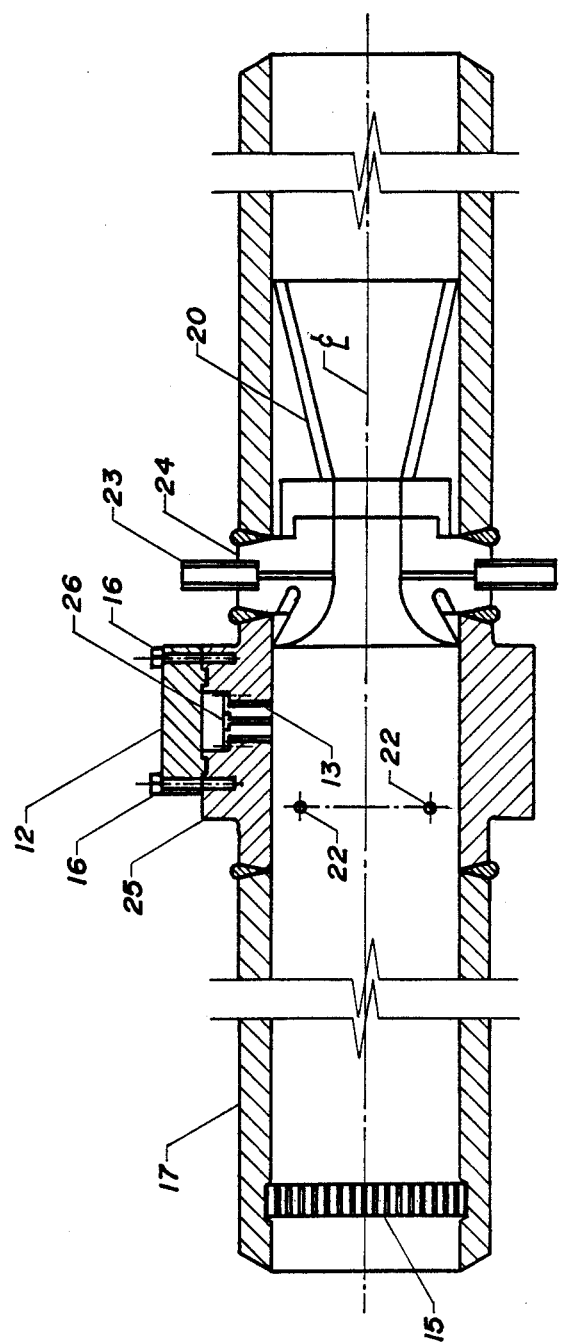
FIG. 1 is a schematic cross section of a typical flow measuring section.

In FIG. 1, a typical flow measuring pipe section is shown. Flow to be measured enters at the left flowing in the direction of the arrow. It first passes through a flow straightener 15 then through the nozzle 24 and then out the remaining portion of the pipe 17 to the process system.

Pipe wall pressure taps 22 are located just ahead of the nozzle 24. Throat taps 23 are located in the cylindrical portion of the nozzle.

A special cylindrical section 25 is machined to provide an inner circular hole that matches the internal surfaces of the adjacent pipe and flow sections. Weld preps are machined on the ends to facilitate welding the components. A flat surface is machined on an outer portion of the cylinder to provide for installation of the inspection plug 13 and the blind flange 12 that prevents leakage during operation and access to the plug for inspection during shut down periods.

The inspection port plug 13 forms a part of the inner pipe surface in the vicinity of the pipe wall pressure taps 22.

Figure 2:
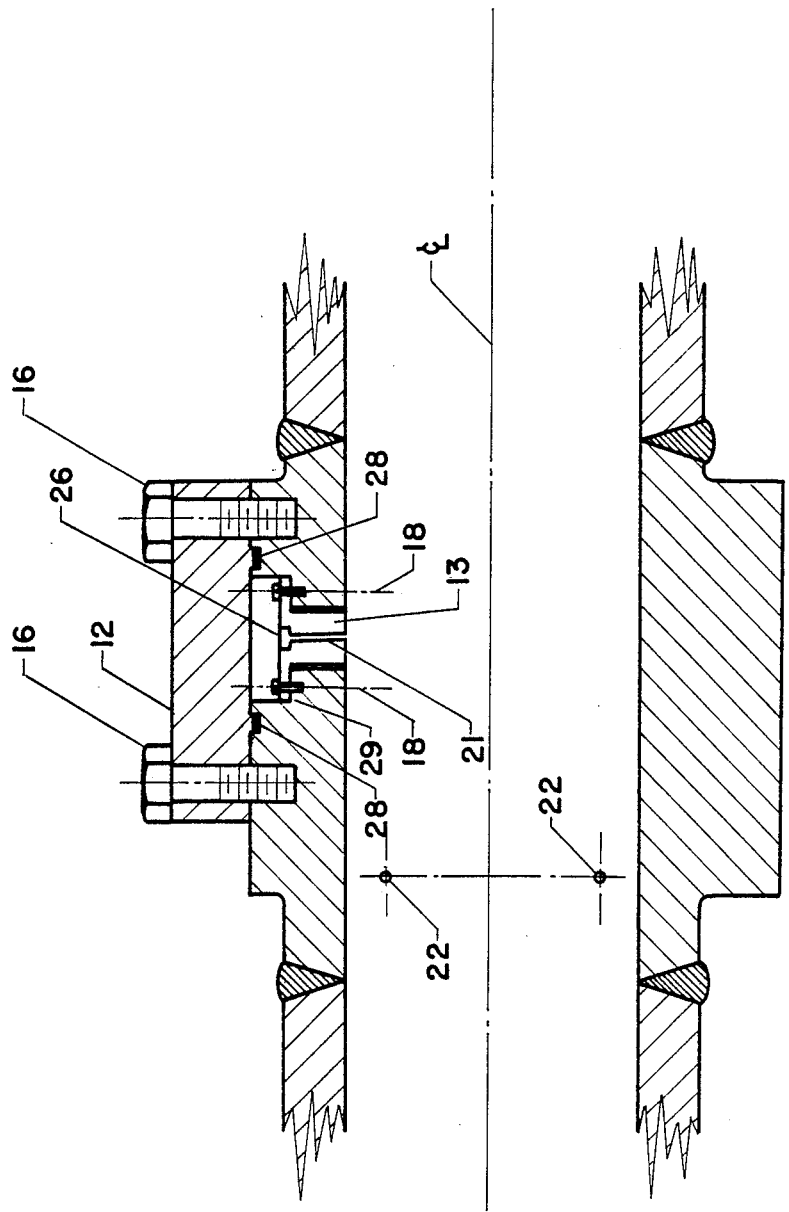
FIG. 2 is a cross section of the inspection port.

In FIG. 2 the inspection port is shown in cross section. The pipe wall is penetrated by a closely fitted inspection port plug 13. The plug 13 is held radially by a combination of a machined shoulder on the cylindrical section 25 and bolts that secure the flange of the inspection port plug 13 to the machined shoulder. The inspection port plug is rotationally positioned by the locating dowel pins 19 shown on FIG. 3.

The inspection port plug 13 also includes a threaded lifting hole 26 and a small pressure equalizing hole 21. The blind flange 12 is shown with bolts 16.

Figure 3:
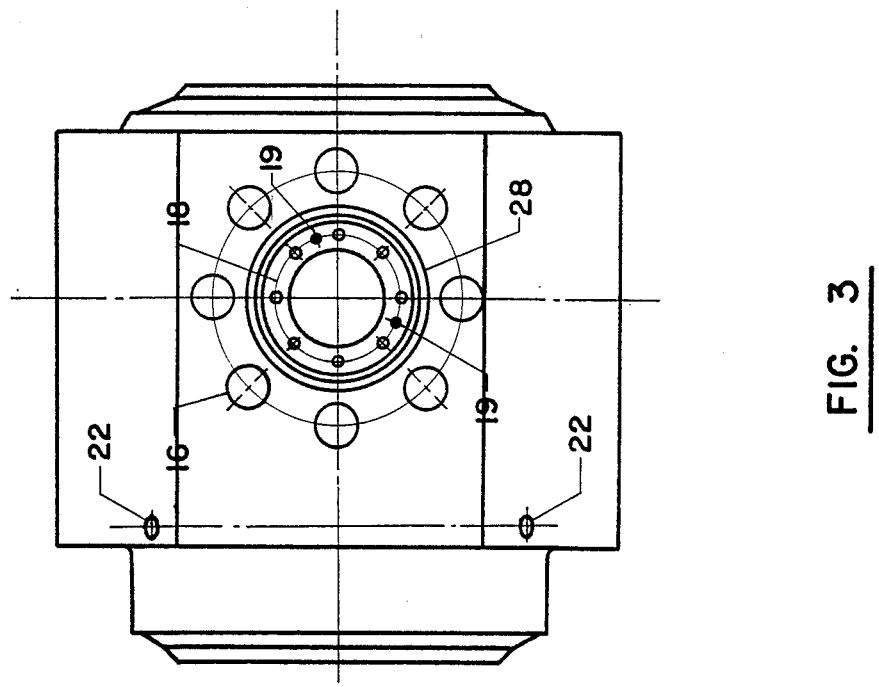
FIG. 3 is a top view of the inspection port.

FIG. 3 shows the surface of the flange of the inspection port plug 13 where it is bolted to the cylindrical section 25. Fastening bolts 18 hold the plug 13 firmly against the internal machined surface. Dowel pins 19 locate the pipe plug 13 in the correct position of rotation. This position is established prior to finish machining of the inner bore cylindrical section. The plug should have some extra stock on its inner surface in order to insure that the final machined inner surface of the cylindrical section and the inspection port plug will essentially provide a continuous, smooth surface.

In operation, the parts are fully assembled so that the inspection port plug 13 is correctly positioned to help form a continuous, smooth internal surface of the pipe.

After machining, the plug should be disassembled to remove all burrs from it and the pipe wall but with a minimum rounding of corners. This should be done and the parts reassembled before the flow measuring section is calibrated.

To inspect the nozzle after periods of operation, the blind flange 12 and its gasket 28 should be removed to provide access to the inspection port plug 13. The bolts 18 should be removed to allow for removal of the inspection port plug from the dowel pins.

After removal, the nozzle inlet surface can be felt and examined.

This is the preferred arrangement of the invention. Other variations may occur to those skilled and it is desired to secure by the appended claims, all such modifications as fall within the true spirit and scope of the invention.

I claim:

1. An inspection system for a nozzel (24) of a flow measuring pipe system, said inspection system comprising: a housing (25) that is fluidly coupled to the nozzle (24), said housing (25) including a machined circular bore whose internal diameter is the same as the internal diameter of an immediately adjacent pipe (17), an inspection port positioned immediately upstream of the nozzle (24) and extending through the wall of the housing (24), the port including a shoulder; an inspection plug (13) positioned within the inspection port, said plug (13) including at a first end flange that directly contacts the shoulder, a machined surface at its surface at its second opposite end, a pressure equalization bore extending from the first end to the second end, and pins extending from the flange of the plug (13); a blind flange (12) positioned on the exterior surface of the housing

(25) and over the inspection port; and a gasket (28) positioned between the housing (25) and flange (12);

whereby the pins permit the plug (13) to be rotationally positioned within the port such that the machined surface of the plug (13) always forms a single continuous, smooth surface with the surface of the machined circular bore, allowing for a minimum of surface discontinuity;

whereby the flange (12) is connected to the shoulder via at least one bolt;

whereby at least one bolt couples the blind flange (12) and gasket to the housing (25) such that the inspection port and machined circular bore are fluidly isolated from the exterior of the housing (25);

whereby access for inspection of the nozzel (24) may be achieved by removal of the blind flange (12), gasket (28), bolts and plug (13);

whereby the plug (13) may be reinserted in the housing (25) such that the single continuous, smooth surface is recreated to minimize errors in flowrate measurements by the flow measuring pipe system.

\* \* \* \* \*